(12) United States Patent
Johnson (10) Patent No.: US 8,301,931 B2
(45) Date of Patent: Oct. 30, 2012

(54) TIME SYNCHRONIZATION OF PORTABLE DEVICES

(75) Inventor: Matthew Johnson, Spokane, WA (US)

(73) Assignee: Itron, Inc., Liberty Lake, WA (US)

(*) Notice: Subject to any disclaimer, the term of this patent is extended or adjusted under 35 U.S.C. 154(b) by 673 days.

(21) Appl. No.: 12/470,694

(22) Filed: May 22, 2009

(65) Prior Publication Data

US 2010/0299457 A1 Nov. 25, 2010

(51) Int. Cl.
*G06F 1/12* (2006.01)
*G08C 15/06* (2006.01)

(52) U.S. Cl. .......... 713/400; 713/401; 340/870.01; 340/870.02; 340/870.03; 710/13; 702/62

(58) Field of Classification Search .......... 710/13; 702/62; 713/400–401; 340/870.01–870.03
See application file for complete search history.

(56) References Cited

U.S. PATENT DOCUMENTS

| | | | |
|---|---|---|---|
| 4,614,945 A | 9/1986 | Brunius et al. | |
| 5,719,564 A | 2/1998 | Sears | |
| 6,069,571 A | 5/2000 | Tell | |
| 6,100,817 A | 8/2000 | Mason et al. | |
| 6,195,018 B1 | 2/2001 | Ragle et al. | |
| 6,295,541 B1 | 9/2001 | Bodnar et al. | |
| 6,636,744 B1 | 10/2003 | Da | |
| 6,639,957 B2 | 10/2003 | Cahill-O'Brien et al. | |
| 6,657,552 B2 * | 12/2003 | Belski et al. | 340/870.02 |
| 6,798,352 B2 | 9/2004 | Holowick | |
| 6,946,972 B2 | 9/2005 | Mueller et al. | |
| 7,012,546 B1 * | 3/2006 | Zigdon et al. | 340/870.02 |
| 7,089,089 B2 | 8/2006 | Cumming et al. | |
| 7,283,580 B2 * | 10/2007 | Cumeralto et al. | 375/137 |
| 7,312,721 B2 | 12/2007 | Mason et al. | |
| 7,317,404 B2 * | 1/2008 | Cumeralto et al. | 340/870.02 |
| 7,343,255 B2 * | 3/2008 | Osterloh et al. | 702/62 |
| 7,362,236 B2 | 4/2008 | Hoiness | |
| 7,372,372 B2 * | 5/2008 | Osterloh et al. | 340/870.02 |
| 7,400,264 B2 * | 7/2008 | Boaz | 340/870.02 |
| 7,479,895 B2 * | 1/2009 | Osterloh et al. | 340/870.02 |
| 7,561,062 B2 * | 7/2009 | Schleich et al. | 340/870.02 |
| 7,741,976 B2 | 6/2010 | Crider et al. | |
| 7,844,409 B2 * | 11/2010 | Johnson et al. | 702/62 |
| 7,961,554 B2 * | 6/2011 | Seal et al. | 368/10 |
| 2001/0022823 A1 | 9/2001 | Renaud | |
| 2002/0082748 A1 | 6/2002 | Enga et al. | |
| 2002/0145537 A1 | 10/2002 | Mueller et al. | |
| 2003/0128134 A1 | 7/2003 | Fierro et al. | |

(Continued)

OTHER PUBLICATIONS

Masterclock—"MCRPCI—Real Time Clock Card"; 11 pages, Dated May 1, 2006.*

(Continued)

*Primary Examiner* — Brian Misiura
(74) *Attorney, Agent, or Firm* — Dority & Manning, P.A.

(57) ABSTRACT

A portable time transfer device is provided to transfer accurate date/time to reader devices and, thus, the reader devices do not have to be connected to a source of accurate time. A host computing system is configured to synchronize the portable time transfer device to a network, GPS, or other source of precise (accurate) time. Once the portable time transfer device is synchronized to the accurate date/time by the host computing system, the portable time transfer device is ready to be used by reader devices or any other devices (e.g., laptops, etc.) which need to maintain accurate time regardless of the connectivity to a network or GPS.

13 Claims, 5 Drawing Sheets

U.S. PATENT DOCUMENTS

| | | |
|---|---|---|
| 2005/0237221 A1 | 10/2005 | Brian et al. |
| 2005/0237959 A1 | 10/2005 | Osterloh et al. |
| 2006/0066457 A1 | 3/2006 | Mueller et al. |
| 2006/0071812 A1 | 4/2006 | Mason, Jr. et al. |
| 2006/0119488 A1 | 6/2006 | Hoiness |
| 2006/0224335 A1 | 10/2006 | Borleske et al. |
| 2007/0063867 A1 | 3/2007 | Fuller et al. |
| 2007/0236362 A1 | 10/2007 | Brian et al. |
| 2008/0064934 A1 | 3/2008 | Frei et al. |
| 2008/0075218 A1 | 3/2008 | Monier et al. |
| 2008/0158007 A1 | 7/2008 | Nagy et al. |
| 2008/0172336 A1* | 7/2008 | Srinivasan ............ 705/51 |
| 2008/0224889 A1 | 9/2008 | Wyk et al. |
| 2008/0272933 A1 | 11/2008 | Cahill-O'Brien et al. |
| 2009/0102681 A1 | 4/2009 | Brennan, Jr. et al. |
| 2010/0188255 A1* | 7/2010 | Cornwall ............ 340/870.02 |
| 2010/0188256 A1* | 7/2010 | Cornwall et al. ......... 340/870.02 |
| 2010/0188938 A1* | 7/2010 | Johnson et al. ............ 368/47 |
| 2010/0192001 A1* | 7/2010 | Cornwall et al. ............ 713/400 |

OTHER PUBLICATIONS

MAXIM—"Security Token Microcontroller with RTC and USB"; 2 pages, Dated Apr. 2010.*
KEYLOK—"KEYLOK Fortress—Building a Secure Software Environment"—5 pages, No Date Provided.*
Itron—"ChoiceConnect—Changing the way utilities think about advanced meter data collection"; 4 pages, Dated Sep. 2010.*
Itron—"FC300—Ultra-Rugged Handheld Computer"; 2 pages, Dated Oct. 2011.*
Itron—"Mobile Collection 2.0—Administration Guide"; 88 pages, Dated Nov. 2004.*
Itron—"Mobile Collector Lite"; 4 pages, Dated Apr. 2007.*

\* cited by examiner

TIME SYNCHRONIZATION OF PORTABLE DEVICES

BACKGROUND

A large portion of utility consumption meter reading, such as for water, gas, or electricity, has been accomplished automatically by portable reader devices. For example, unattended reader devices are used in most drive-by reading systems to collect "meter reading data" that quantify the consumption of utility services. The unattended reader devices are typically mounted on top of vehicles that drive through a designated geographic area and are designed to be automatically operated when collecting meter reading data. In such systems, the collected meter reading data are processed later in a centralized reading and processing system. Thus, when the unattended reader devices collect meter reading data, it is critical to maintain accurate time in the reader devices to timestamp readings when they are collected and stored.

Conventionally, the reader devices rely on a time source provided by a network or Global Positioning System (GPS) for synchronization. However, there are some areas or spots where no network or GPS connection is available (e.g., when the reader device does not have connectivity through a network to a source of precise time) since the drive-by reading systems tend to cover various conditioned geographic areas. In such cases, the unattended reader devices are not always able to properly adjust their clocks to accurate time, which may result in generating inaccurate timestamps in the collected meter reading data.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An apparatus, system and method are provided for time synchronization of reader devices that are used for collecting meter reading data and other data in a meter reading system. In one aspect, a portable time transfer device is used to transfer accurate time to the reader devices and, thus, the reader devices do not have to be connected to a source of accurate time. A host computing system that is configured to process the meter reading data may synchronize the portable time transfer device to a network, GPS, or other source of precise (accurate) time. Once the portable time transfer device is synchronized to the accurate time by the host computing system, the portable time transfer device is ready to be used by reader devices or any other devices (e.g., laptops, PDAs, cell phones, etc.) which need to maintain accurate time regardless of the connectivity to a network or GPS. In one aspect, as most data transfer is done by the host computing system or the reader devices, the portable time transfer device can be maintained with a small number of components, such as a real time clock, memory, etc., without requiring any user interface components or user interactions when it is used to transfer accurate date/time within the meter reading system.

In accordance with an aspect of one embodiment, a system is provided for synchronizing reader devices to a standard time (accurate date/time) where the reader devices are configured to timestamp the meter reading data collected from remote endpoint devices. The system comprises a time transfer device for transferring the standard time to the reader devices. The time transfer device comprises a clock component and a power supply component. The system further comprises a source of precise time, such as a computing system, to which the time transfer device is connected for synchronizing the clock component to a source of accurate time. In operation, the clock component of the time transfer device is referenced by the reader devices when the standard time is transferred to the reader devices. In one aspect, each reader device is configured to synchronize its processor/radio clock to the standard time transferred from the time transfer device as the time transfer device is connected to the reader device. After the processor/radio clock has been synchronized, the reader device collects and time stamps data and stores the collected data into a memory component of the time transfer device.

In accordance with another aspect, a method is provided for transferring a standard time within a meter reading system that includes a source of precise time, such as a computing system, a reader device, and a time transfer device. The time transfer device is accessible by the computing system and the reader device for transferring metering data and the standard time. The method comprises detecting the time transfer device that is connected to the computing system, obtaining accurate time from a time source, and accessing a clock of the time transfer device to read a device time of the time transfer device. If the device time is within the tolerance of the accurate time, the data stored in the time transfer device are downloaded into the computing system. The clock of the time transfer device is synchronized to the obtained accurate time while the time transfer device is connected to the computing system.

In accordance with yet another aspect, an apparatus comprising a clock and a memory is provided for transferring a standard time to reader devices in a meter reading system. The apparatus is operable to receive, from a host computing system, a standard time into the clock. Subsequently, the clock is synchronized to the received standard time. The apparatus is operable to connect to a reader device for transferring the standard time upon connection of the apparatus. In one embodiment, the reader device is synchronized to the standard time before collecting data from endpoint devices. The apparatus is operable to connect to the host computing system for downloading the data stored in the memory. After connecting to the host computing system, the apparatus receives, from the host computing system, a new standard time into the clock, wherein the clock is re-synchronized to the standard time.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Figure 1:
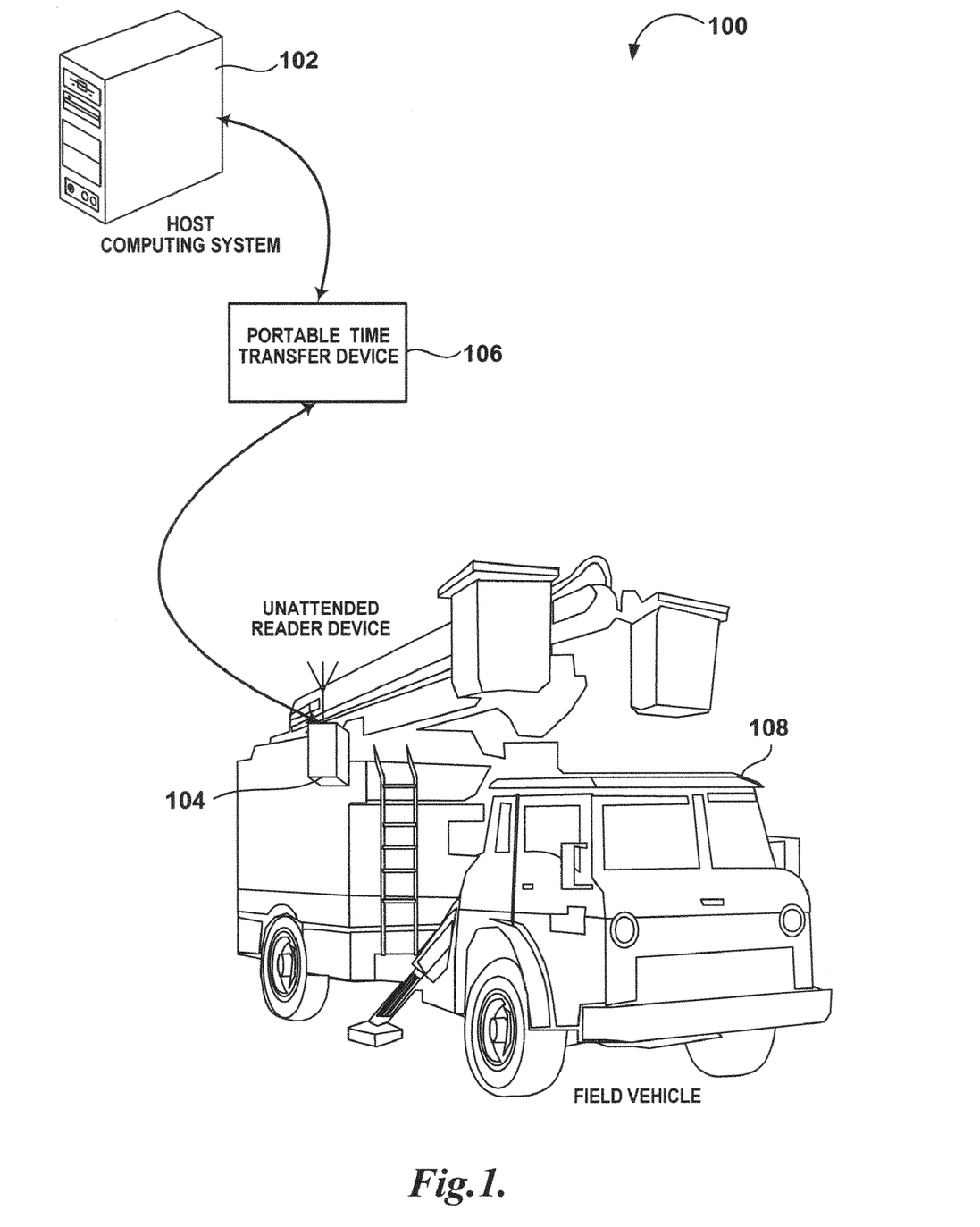
FIG. 1 is a schematic block diagram depicting an illustrative meter reading system in accordance with an embodiment of the present disclosure.

Referring to FIG. 1, the following is intended to provide a general overview of one embodiment of a meter reading system 100 in which aspects of the disclosed subject matter may be implemented. In one embodiment, the meter reading system 100 may be an automatic meter reading system that reads and monitors utility meters remotely, typically using field vehicles and portable/mobile reader devices. The meter reading system 100 may comprise a host computing system 102 for reading, processing, and managing the collection of meter reading data. The meter reading system 100 also comprises one or more reader devices 104 for collecting meter reading data and other data from various endpoint devices (not shown). Generally described, the endpoint devices in the meter reading system are capable of transmitting/receiving wired or wireless communications and are typically coupled with utility meters which may be gas meters, water meters, electric meters and the like. As used herein, the terms, a "reader device," a "portable reader device," and an "unattended reader," refer to any type of a portable device that can be used for collecting data remotely in various embodiments of a meter reading system and are interchangeable with each other.

In some embodiments, one or more reader devices 104 may be associated with (e.g., mounted on top of) a field vehicle 108 that drives through a designated geographic area. In this regard, the reader devices 104 are unattended readers that are typically designed to be automatically operated without human operator interaction when collecting data. The meter reading system 100 further includes a portable time transfer device 106 that is configured to transfer "accurate date/time" to the reader devices 104 and thus the reader devices 104 do not have to be connected to a source of accurate time. As used herein, the term "accurate date/time" refers to a standard local date/time or alternatively Coordinated Universal Time (UTC), which is referenced to synchronize various devices in the meter reading system 100.

By way of example, in one embodiment, the host computing system 102 is configured to synchronize the portable time transfer device 106 to "accurate date/time" obtained from a GPS, a network (e.g., a network using the Network Time Protocol (NTP) or the like), or other reliable time sources. In particular, the host computing system 102 may include a software module or logic configured to recognize (detect) the portable time transfer device 106 when connected to the host computing system 102. Upon detection of the portable time transfer device 106, the host computing system synchronizes the timing device or clock of the portable time transfer device 106 to a network (an Internet Time server or the like), GPS or other source of precise (accurate) time. Once the clock in the portable time transfer device 106 is synchronized to the accurate date/time by the host computing system, the portable time transfer device is ready to be used by reader devices or any other devices (e.g., laptops, PDAs, cell phones, etc.) which need to maintain accurate time regardless of the connectivity to a network or GPS.

In one aspect, most data transfer may be done by the host computing system or the reader devices and thus the portable time transfer device 106 may include basic components, such as a real-time clock, memory, etc., to operate without requiring any user interface components. Moreover, the portable time transfer device 106 does not need user interactions in connection with transferring the accurate date/time within the meter reading system 100.

In some embodiments, the portable time transfer device 106 is a small size memory device that can be also used to transfer the meter reading data or other data collected by the reader device 104 to the host computing system 102. For example, the portable time transfer device 106 may be a portable memory device such as a flash memory card, Personal Computer Memory Card Interface Adapter (PCMCIA) memory cards, Universal Serial Bus (USB) flash drives, solid-state floppy-disk cards, or the like. Such an exemplary portable time transfer device will be described in further detail below in connection with FIG. 2.

Figure 2:
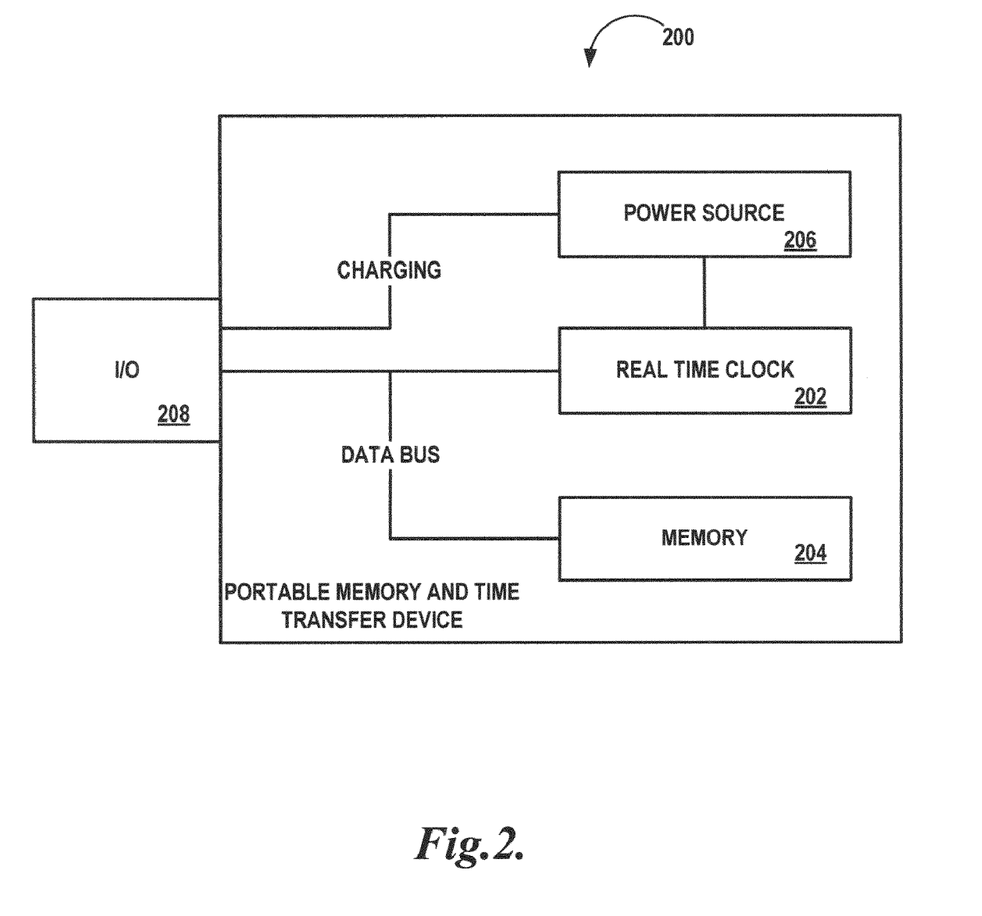
FIG. 2 is a block diagram illustrating components of a portable memory/time transfer device that can be used in the meter reading system of FIG. 1.

Referring now to FIG. 2, a schematic diagram of an exemplary portable memory/time transfer (hereinafter "PMTT") device 200 that can be used in the meter reading system of FIG. 1 is depicted. As shown, the PMTT device 200 comprises a real-time component or clock 202 that transfers the accurate date/time to reader devices and a memory component 204 that is a medium for storing and transferring meter reading and other data between the reader device and host computing system. The portable memory device 200 may also comprise a power source component 206 such as a super capacitor or battery and an interface component 208 for allowing the reader devices (or host computing system) to access the memory component 210 and the real-time component or clock 202 of the PMTT device 200. In one aspect, the PMTT device 200 is configured to consume very low power provided from the power source component 206 mainly for maintaining accurate date/time in the real-time component or clock 202.

As will be well appreciated by those skilled in the art, the data stored in the PMTT device 200 can be transferred through a designated I/O port of the reader devices (or the host computing system). For example, if the PMTT device is a USB flash drive, the PMTT device is connected to the reader device via a USB port of the reader devices. Likewise, if the portable memory device is a PCMCIA Type I or Type II memory card, a PCMCIA slot of the reader device (or the host computing system) can be used. In one embodiment, the reader device includes a software module or logic that is configured to recognize the presence of the PMTT device, to extract the date and time information from the PMTT device, and to adjust its internal clock to the extracted information (date and time).

For ease of discussion, embodiments and examples described herein are assumed to use the PMTT device generally depicted in FIG. 2. However, it is noted that such a PMTT device is just an example and should not be construed as limiting the scope of the claimed subject matter. It is further noted that any type of portable device can be used as a portable time transfer device as long as the portable device comprises a clock component that functions as a real time clock, a power source, and control and interface logic that allows the host computing system and the reader device to access the clock component of the portable device.

Figure 3:
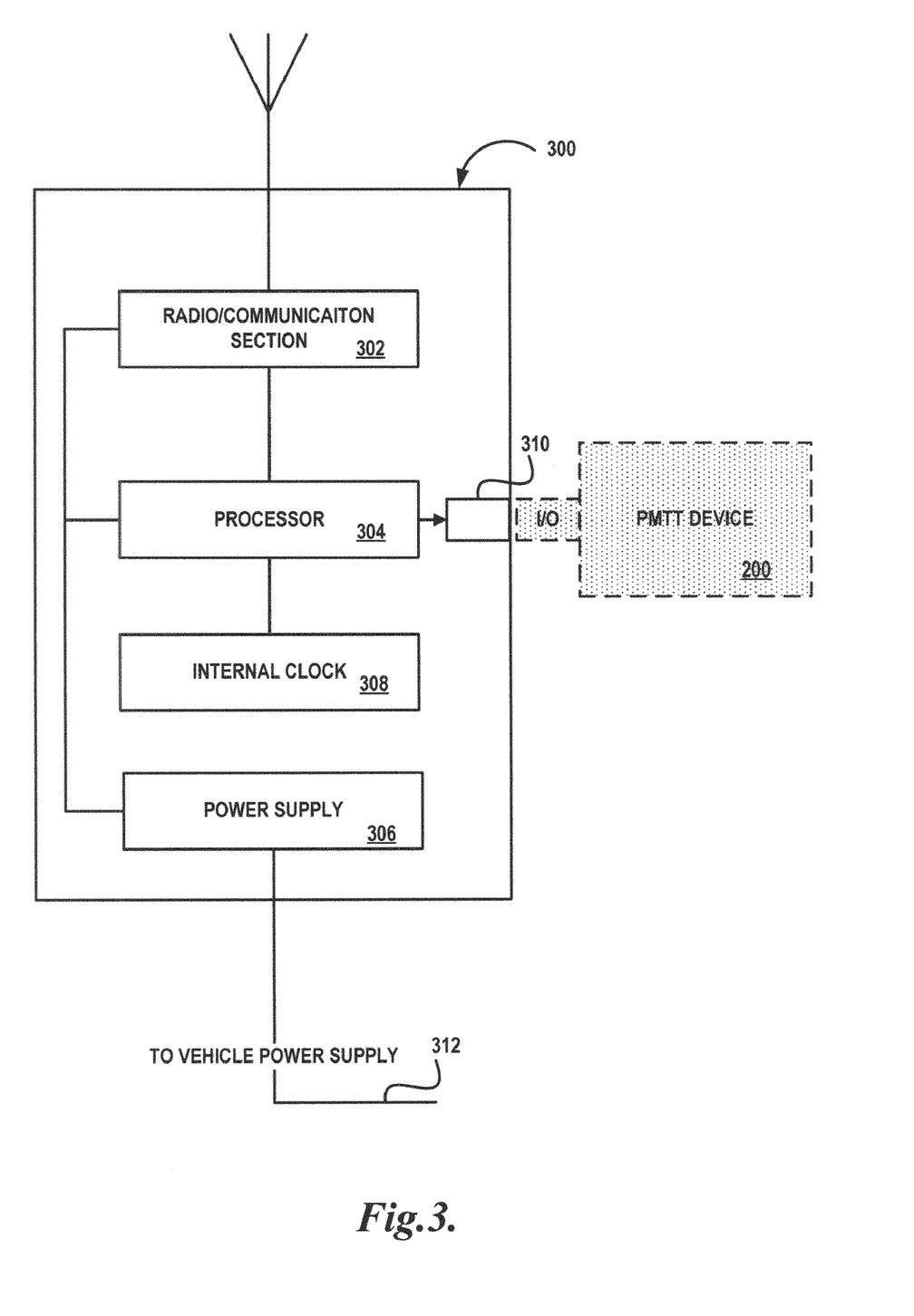
FIG. 3 is a block diagram illustrating components of a reader device that can be used in the meter reading system of FIG. 1 for collecting metering data.

Referring now to FIG. 3, a block diagram 300 depicts exemplary components of a reader device in accordance with an embodiment of the described subject matter. As shown, the reader device 300 may comprise a radio/communication section 302 for communicating with various endpoint devices, a processor 304 and a power supply 306. Moreover, the reader device 300 includes one or more I/O ports 310 to which the PMTT device 200 can be connected. In one embodiment, the reader device 300 may be initialized before collecting meter reading data from various endpoint devices in a particular geographic area. In one embodiment, the reader device 300 may be initialized when the field vehicle's power is provided through a power supply line 312 to the power supply 306. During the initialization, the PMTT device 200 is plugged (inserted) into the reader device 300 to synchronize an internal clock 308 of the reader device 300. In this embodiment, upon connection of the PMTT device, the processor 304 of the reader device 300 that implements the interface and control logic detects the presence of the PMTT device 200.

The reader device 300 (i.e., the processor 304 of the reader device) reads the accurate time/date from the real time clock 202 (see FIG. 2) of the PMTT device 200 and synchronizes its internal clock to the accurate time/date. An exemplary synchronization process will be discussed in further detail in connection with a flow diagram depicted in FIG. 5. After the initialization, the reader device 300 is ready to receive data though the radio/communication section 302. In operation, when the reader device 300 receives meter reading data and other data from various endpoint devices, the reader device 300 may timestamp the meter reading data according to its internal clock 308 (e.g., a processor/radio clock, a processor implemented clock, a real time clock, etc.), and store the meter reading data into the memory component 204 (see FIG. 2) of the PMTT device 200.

Figure 4:
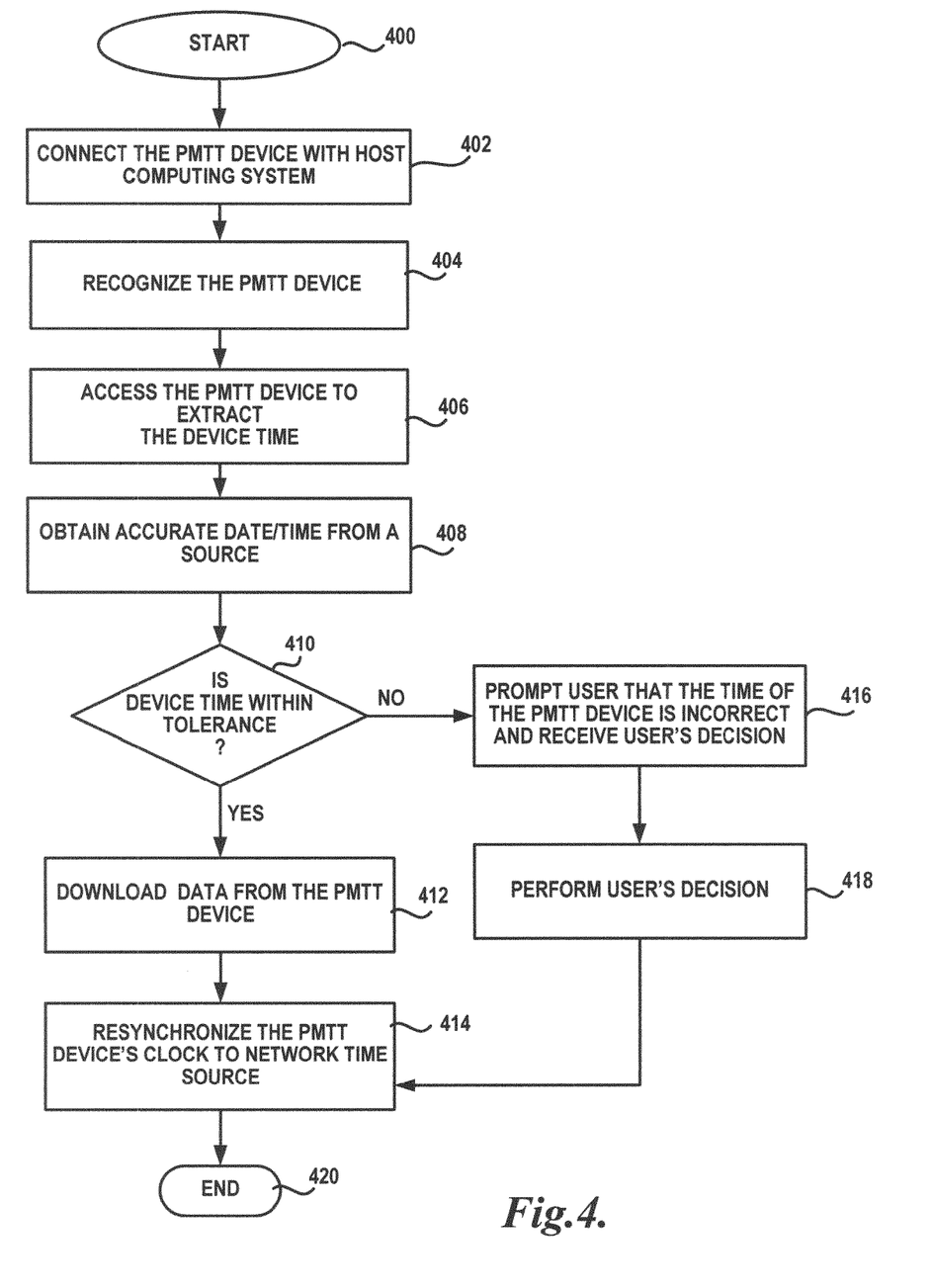
FIG. 4 is a flow diagram of one example of a host computing system routine in accordance with one embodiment of the present disclosure.

Now with reference to FIG. 4, one representative embodiment of a host computing system routine 400 is provided. As depicted in FIG. 4, the host computing system routine 400 begins at block 402 where a PMTT device is connected with the host computing system for transferring, for example, stored data that may have been collected by the reader device(s). As discussed above, the host computing system comprises at least one I/O port or slot to which the PMTT device can be connected. At block 404, the presence of the PMTT device is detected. The host computing system recognizes the PMTT device being connected through a designated I/O port or slot. Additionally or alternatively, the PMTT device can be connected to a hub device that bridges the PMTT device and the designated I/O port of the host computing system. At block 406, the PMTT device is accessed and the device time is read (extracted) from the PMTT device.

At block 408, the accurate date/time is obtained from a reliable time source, such as a network, GPS, or the like. If the current device time is not accurate, the collected meter reading data may not be downloaded for further processing and the PMTT device is to be re-synchronized to the accurate date/time. However, if the current device time of the PMTT device is accurate, the collected meter reading data may be safe to download for further processing. At a decision block 410, a determination is made as to whether the device time is within the tolerance (a certain error range) that is previously defined. At block 416, if it is determined that the current device time is not accurate (i.e., the device time is not within the tolerance allowed), a user is prompted that the time of the PMTT device is incorrect. In some embodiments, although the time of the PMTT device is not accurate, the user is allowed to decide on an exception process for the meter reading data. For example, the meter reading data and other data stored in the PMTT device may be downloaded anyway into the host computing system for processing. In other embodiments, the host computing system may maintain an additional database for storing meter reading data with incorrect time stamps along with the information of the device time. At block 418, the user's decision on the exception process is performed.

If it is determined that the device time is within the tolerance at decision block 410, the meter reading data are downloaded from the reader device and stored in a memory component of the host computing system at block 412. As will be appreciated by one of ordinary skill in the art, the memory component of the host computing system may be one example of computer-readable media suited to store data and program modules of the host computing system. As used herein, the term "computer-readable media" includes volatile and non-volatile and removable and non-removable memory implemented in any method or technology capable of storing information, such as computer-readable instructions, data structures, program modules, or other data. At block 414, after block 412 or block 418, the real time clock of the PMTT device is synchronized to the obtained accurate date/time. As discussed above, the host computing system accesses the clock of the PMTT device and updates the date and time of the clock in accordance with the obtained accurate time. The host computing system routine 400 ends at block 420.

It should be well understood that host computing system routine 400 described above with reference to FIG. 4 does not show all of the steps and functions performed within the host computing system. Although the host computing routine 400 generally describes the process when the PMTT device is connected to transfer the data to the host computing system, the PMTT device can be connected with the host computing system simply to synchronize its real time clock to accurate date/time. Those skilled in the art and others will recognize that some steps and/or exchanges of data described above may be performed in a different order, omitted/added, or otherwise varied without departing from the scope of the claimed subject matter.

Figure 5:
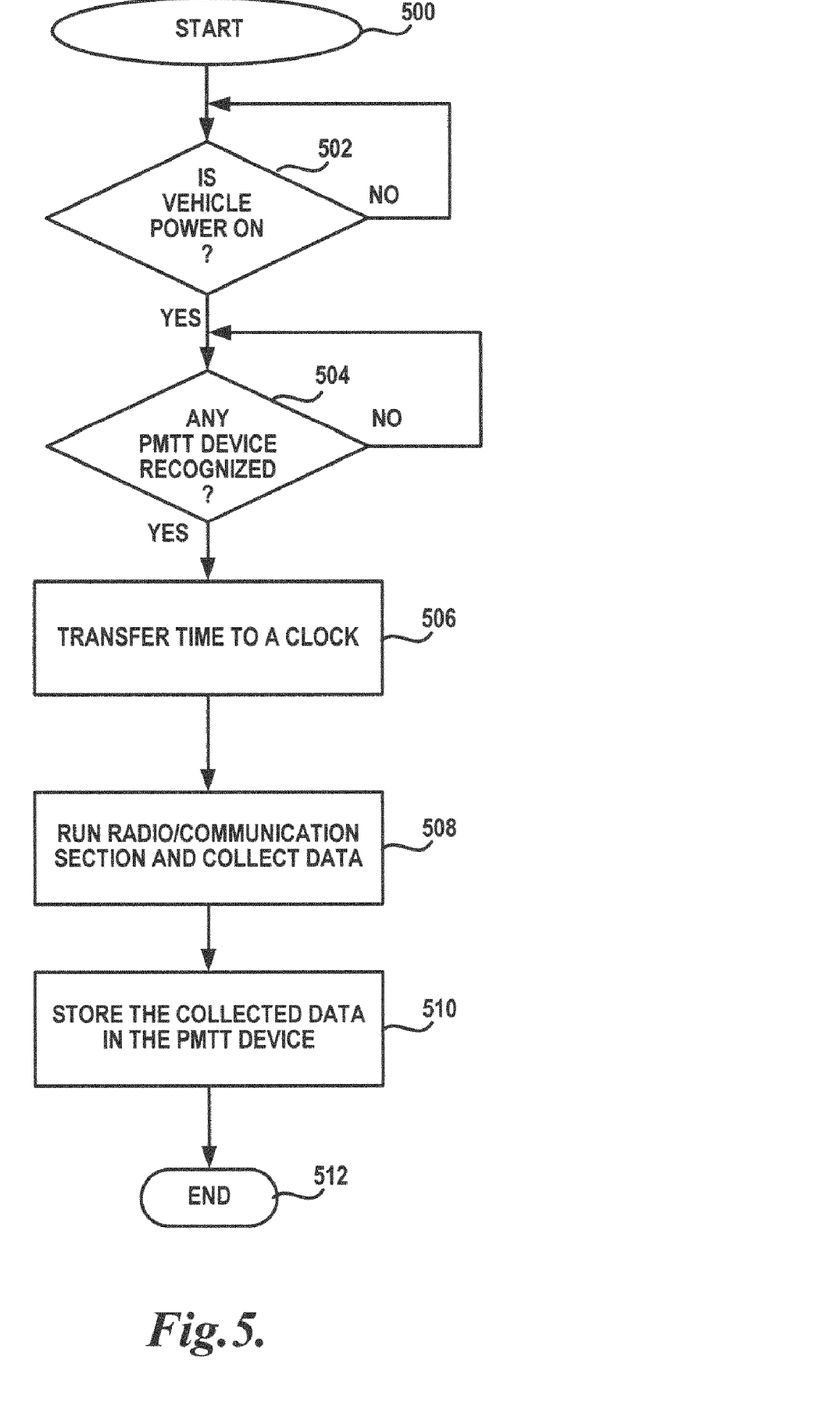
FIG. 5 is a flow diagram of one example of a reader device routine in accordance with one embodiment of the present disclosure.

Referring now to FIG. 5, a flow diagram of one representative embodiment of a reader device routine 500 in operation is depicted. As with FIG. 4, the reader device routine 500 is described in an embodiment of the meter reading system 100 depicted in FIG. 1, which reads and monitors utility meters remotely, using wireless/radio communication. In this embodiment, the reader devices mounted on the field vehicles are generally used to collect meter reading data and other data from endpoint devices. Each reader device may comprise the control/interface logic that is implemented by the processor to extract and transfer information from/to the PMTT device.

In one embodiment, a reader device is initialized to be ready for collecting data from endpoint devices. Beginning with decision block 502, a determination is made whether the reader device is powered up by the vehicle. In some embodiments, as the vehicle power to the reader device is on, the reader device adjusts its internal clock and prepares to receive or collect meter reading data and other data from endpoint devices (utility meters). In those embodiments, for its initialization, the reader device accesses the PMTT device to obtain the accurate date/time and then synchronizes its internal clock. The reader device may not be ready to receive data from endpoint devices until the initialization is done. Thus, if it is determined that the vehicle power is not supplied to the device, the routine repeats decision block 502 until the unattended device is powered up by the field vehicle. In alternative embodiments, a human operator/driver can start the initialization of the unattended device by connecting the device to other power supplies. At decision block 504, a determination is made as to whether the PMTT device is connected to the unattended device. As discussed in FIG. 4, in this embodiment, the PMTT device has been already synchronized to the accurate date/time by the host computing system and is ready to be used as a standard time-transfer device. If the PMTT device is detected, the accurate date/time is transferred from the PMTT device to the reader device as illustrated at block 506. Consequently, the clock of the reader device is synchronized to the accurate date/time transferred from the PMTT device.

At block 508, the radio/communication section of the reader device is activated and the data are collected from endpoint devices. At block 510, the collected data are stored in the PMTT device with time-stamps. As discussed above, the reader device accesses the clock and memory component of the PMTT device, and extracts or writes information from/to the PMTT device. The meter reading data and other data are collected and stored as long as the reader device is in operation. The reader device routine 500 proceeds to block 512 where the routine terminates.

It should be well understood that the reader device routine 500 described above with reference to FIG. 5 does not show all of the functions and steps performed within the reader device. Instead, the reader device routine 500 generally describes the process performed to transfer the date/time information from the PMTT device to the reader device in order to properly collect data from endpoint devices. Those skilled in the art and others will recognize that some functions/steps and/or exchange of data described above may be performed in a different order, omitted/added, or otherwise varied without departing from the scope of the claimed subject matter. For example, the time stamped data may be stored in the reader device instead of the PMTT. The data may then be transferred for further processing via the radio/communication section or other data transfer devices.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A method for transferring a standard for accurate time within a meter reading system that includes a computing system, a reader device, and a time transfer device, wherein the time transfer device is accessible by the computing system and the reader device, the method comprising:
   detecting the time transfer device that is connected to the computing system;
   obtaining accurate time from a time source;
   accessing a clock of the time transfer device to read a device time of the time transfer device;
   downloading data stored in the time transfer device; and
   synchronizing the clock of the time transfer device to the obtained accurate time.

2. The method of claim 1, wherein the reader device synchronizes an internal clock to the time read from the clock of the time transfer device.

3. The method of claim 1, wherein the reader device collects data, times tamps the collected data and stores the time stamped data in the time transfer device.

4. The method of claim 3, wherein the time transfer device is connected to the computing system in order to transfer the stored data.

5. The method of claim 1, wherein the data stored in the time transfer device is downloaded into the computing system if a difference between the device time and the accurate time is within a tolerance range.

6. An apparatus for transferring a standard time to reader devices in a meter reading system, the apparatus comprising a clock and a memory, the apparatus operable to:
   receive, from a host computing system, a first standard time into the clock, wherein the clock is synchronized to the received first standard time;
   connect to a reader device for transferring the first standard time, wherein, upon connection, the reader device is synchronized to the first standard time;
   receive data collected by the reader device, the received data being stored in the memory;
   connect to the host computing system for downloading the data stored in the memory; and
   receive, from the host computing system, a second standard time into the clock, wherein the clock is re-synchronized to the second standard time.

7. The apparatus of claim 6, wherein the host computing system obtains the first standard and the second standard times from a source of accurate time.

8. The apparatus of claim 6, wherein the host computing system downloads the data from the memory after verifying that a device time of the clock is within a predefined error range.

9. The apparatus of claim 7, wherein the source of accurate time is a network, or Global Positioning System.

10. The apparatus of claim 6, wherein the reader device comprises a real clock that is synchronized to the first standard time.

11. A method for transferring accurate time from a time transfer device to a reader device, wherein the time transfer device is accessible by the reader device, the method comprising:
   detecting the time transfer device that is connected to the reader device at the time of initialization of the reader device;
   accessing a clock of the time transfer device to read a device time of the time transfer device;
   synchronizing the clock of the reader device to the device time of the time transfer device;
   collecting meter reading data from meters; and
   storing in the time transfer device the collected meter reading data with timestamps based on the clock of the reader device;
   wherein, before the initialization of the reader device, the clock of the time transfer device was synchronized to the accurate time by a computing device that has connectivity to a source of the accurate time.

12. The method of claim 11, wherein, when the time transfer device is connected to the computing device for downloading the stored meter reading data, the computing device synchronizes the time transfer device to the source of accurate time.

13. The method of claim 11, wherein the initialization is triggered when power is provided to the reader device.

* * * * *